Sept. 5, 1950     N. L. DAVIS     2,521,347
DENSIFIER
Filed April 17, 1948
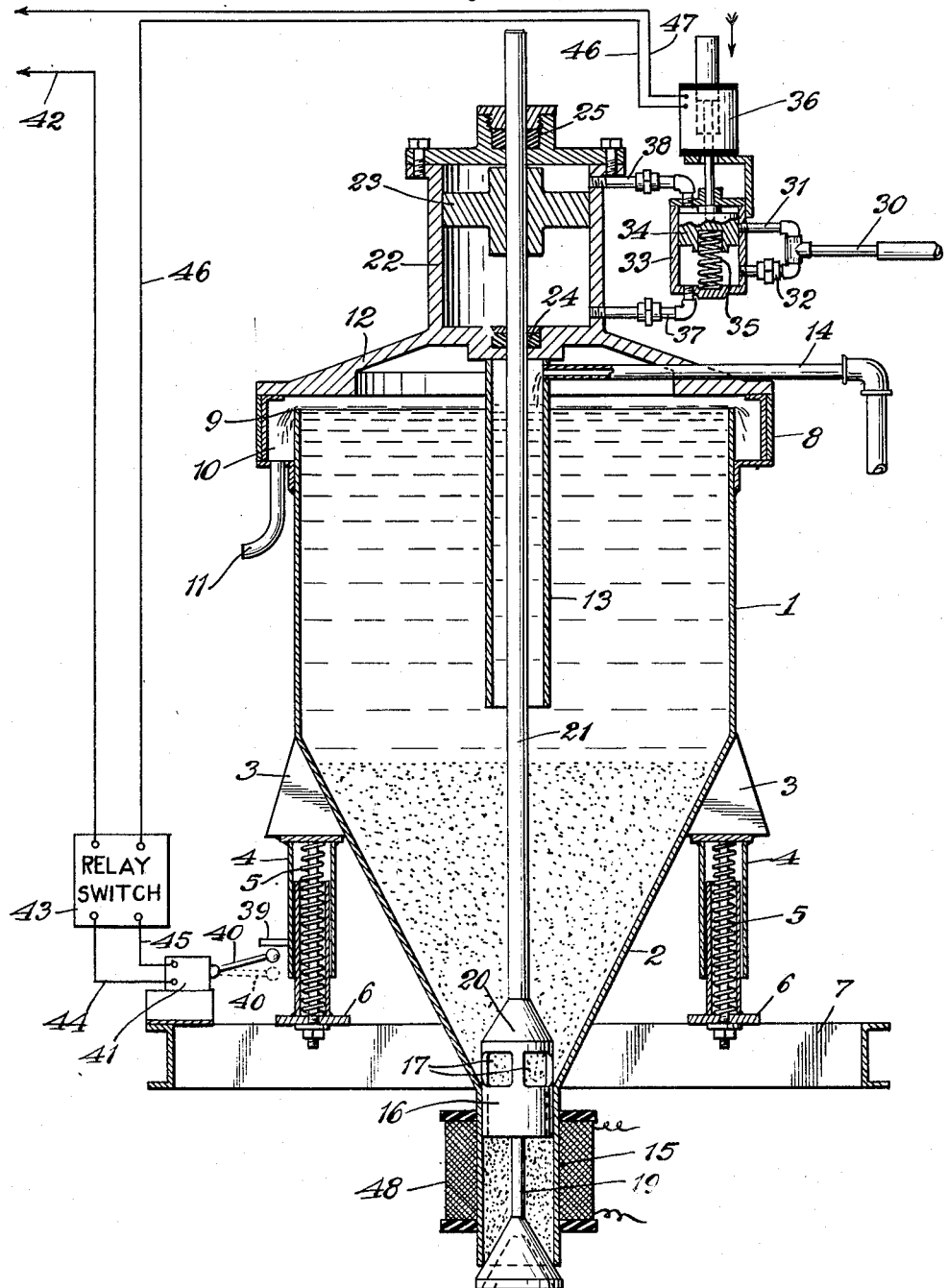
Inventor
Nelson L. Davis
by Parker & Carter
Attorneys.

Patented Sept. 5, 1950

2,521,347

UNITED STATES PATENT OFFICE 2,521,347

DENSIFIER

Nelson L. Davis, Chicago, Ill.

Application April 17, 1948, Serial No. 21,727

1 Claim. (Cl. 210—55)

My invention relates to improvements in densifiers for heavy media for reclaiming and cleaning circuits.

It has for one object to provide a new and improved form of densifier which is especially well adapted to the recovery of finely divided material from water or other liquid carriers.

In connection with float and sink separation, liquid is used of a specific gravity suited to causing the proper separation between the one material which floats on the surface and the other material which is allowed to sink. In some instances, liquid of the proper specific gravity consists of semi-saturated salt brine or chlorinated hydrocarbons. In other instances, the liquid used contains small sized particles in non-colloidal suspension and in these cases the density of particles carried in suspension determines the effective specific gravity of the liquid for making float and sink separation. The nature of the solids carried in suspension can be classified into two groups, namely, magnetic and non-magnetic.

My invention has reference to liquid media carrying solids in suspension, and is especially well adapted to treating magnetic solids, though non-magnetic solids may equally well be treated. Magnetic solids ordinarily used are ferrosilicon, magnetite, blast furnace flue dust or rolling mill scale. Of these, magnetite ($Fe_3O_4$) is most commonly used and it is the product of fine grinding in a ball mill. When ground to minus 325-mesh size, it has a settling velocity of approximately 20 feet per hour in clear water. When magnetized, this same material settles in clear water at the rate of approximately 210 feet per hour.

The purpose of the apparatus disclosed herein is to receive water and magnetite recovered by magnetic separation and to so separate the magnetite from the water which carries it in suspension that two results will be obtained: (1) clear water will be recovered in which there will be little or no magnetite carried in suspension; (2) settled magnetite sludge will be recovered containing a minimum of water. In other words, the sludge which comprises settled solids and some water will be of a density greater than 1.6 specific gravity. Since the specific gravity of magnetite is 4.9, one of the objects of my invention is to recover a sludge which will approach 4.9 specific gravity but certainly greater than 1.6 specific gravity.

My invention is illustrated more or less diagrammatically in the accompanying drawing, wherein a simple form of densifier is shown.

Like parts are indicated by like characters in the drawing.

1 is a cylindrical tank having a conical bottom 2; ears 3 extending radially from the tank adjacent the juncture of the cylinder and the cone. These ears are supported on telescoping sleeves 4 which enclose springs 5 resting on parts 6 on any suitable support indicated diagrammatically as channels 7. Around the outer periphery of the cylindrical portion of the tank 1 and extending upwardly above the wall of the tank 1 is an annular channel 8 which defines an annular discharge reservoir communicating with the tank over the top edge of the tank which serves as a discharge weir 9. The discharge tank 10 from the weir may discharge in any suitable manner from the discharge duct 11.

Resting on the annular ring 8 is any suitable cover or top 12. It may be open or closed as the case may be. Extending downwardly from this cover into the tank is a down-spout 13 open at its lower end to the interior of the tank and supplied with material to be treated through the influent pipe 14 with the liquid which contains the solids to be settled out.

Extending downwardly from the apex of the conical bottom 2 is a discharge sleeve 15. Mounted for reciprocation in this discharge sleeve or spout is a piston valve 16 ported at 17. 18 is a cone valve in opposition to the discharge end of the spout 15 and tied to the piston valve 16 by a connecting rod 19. The piston valve is hollow and closed at the top as indicated at 20, open at the bottom. 21 is a valve stem which extends upwardly through the down-spout 13 to and through the air cylinder 22 which is carried by the covered top 12. 23 is a piston mounted for reciprocation in the cylinder 22, rigidly attached to the piston rod 21. This rod extends clear through the cylinder 20, being provided with the usual packing 24, 25.

When the piston valve 16 and the conical valve 18 are in the position shown in the drawing, solids which may settle in the bottom of the tank are free to pass inwardly through the port 17 and the piston valve 16 to fill the down-spout 15 being limited, as is the liquid in the tank, in its downward travel by the valve 18. If however, the piston valve 16 is moved downwardly and the valve 18 travels with it, the ports 17 will be closed. Then the liquid and solids contained in the spout 15 will be free to discharge around the valve 18 but no more discharges from the tank than is contained in the sleeve 15 at the time that the piston valve ports 17 are closing.

If the piston valve 16 is again raised until the ports 17 are open and 18 closes, liquid from the tank 1 will pass down through the port 17 to fill the spout 15, carrying out settled material which material can continue to settle through the ports 17 into the spout 15.

30 is a compressed air inlet pipe. It has branches 31 and 32 leading to the upper and lower ends of the solenoid valve housing 33, in which reciprocates for distribution a piston 34 which is forced upwardly by the spring 35 and apt to be driven downwardly, as will hereinafter appear, by the solenoid 36. Pipes 37 and 38 connect the upper and lower portions of the solenoid valve cylinder with the upper and lower portions of the air cylinder 22.

Extending outwardly from one of the sleeves 4 is a finger 39 which, in the full line position shown in the drawing, just clears the limit switch arm 40 so that the switch remains in the full line position but when the weight of the tank, its associated parts and liquid therein and the solids accumulated therein, exceeds a certain point, the springs 5 will be compressed, the finger 39 will travel down and force the lever 40 into the dotted line position. 41 is a limit switch controlled by the lever 40. Electric power is received from any suitable source through the conductor 42 to thermal relay switch 43; conductor 44 to limit switch 41; conductor 45 to thermal relay switch 43; conductor 46 to solenoid 36; conductor 47 back to power.

My invention is primarily intended for densification of magnetite, a heavy medium used in float and sink, coal and ore separation. This magnetite as it escapes from the float and sink vessel with the material being treated, is recovered from the material by being washed off the coal or other material by a water spray thus diluting the heavy medium. It must be densified for return to the vessel. As part of the separating process, the magnetite is magnetized as it is separated from other solids in suspension in the water. Since it is magnetized, it tends to flocculate and the flocculated magnetite settles much more rapidly in the densification vessel than it would were it not magnetized.

After densification has taken place and before the magnetite is returned to the float and sink vessel, it must be de-magnetized so that it will not tend to sink too rapidly as its usefulness in the float and sink method would be lost. Therefore, the de-magnetizing coil 48 is shown surrounding the discharge spout 15 so that as the magnetite escapes from the vessel 1, it is automatically de-magnetized for return to the float and sink vessel in a de-magnetized non-flocculent condition.

As long as the relay switch arm 40 is in the upper position, the piston valve remains open, the conical valve 18 remains closed and liquid and solids pass in through the down-spout into the settling tank. The solids tend to continue to go down, settling into the bottom of the tank. The liquid spreads out and travels upwardly at low velocity, the upward velocity of the liquid being much less than the settling solids so that substantially clear liquid passes over the annular discharge weir. This continues, solids piling up and filling the bottom of the tank until the total weight of tank mechanism, liquid and settled solids is sufficient to overcome the springs 5, forcing the relay switch arm 40 into the dotted line position.

The electric circuit closed by the limit switch 41, energizes the solenoid 36 to cause the solenoid to overcome the spring and solenoid valve, permitting compressed air to pass into the area above the piston 23. This forces the piston 23, piston valve 16 and the conical valve 18 down. The sludge settled in the spout 15 is forced down and passes out but de-magnetizes as it passes out of the spout. The piston rod assembly remains in the lower position for approximately five minutes at which time the thermal relay switch 43 opens the circuit and the piston 34 is forced upwardly by the spring 35 back to the position shown in the full line, thus closing the discharge but causing the air to pass into the cylinder on the under side. The thermal relay switch 43 keeps the circuit open for a sufficient time for the spout to fill again and settling to take place therein. After a suitable time, the thermal relay switch 43 again closes the circuit, the piston valve opens and this up and down movement of the piston and conical valve continues until the discharge of settled material from the cone has gone far enough to decrease the weight of the cone and its assembled parts, to permit the springs 5 to raise to the standard position when the relay switch 41 breaks the circuit.

I claim:

In a densifier, a tank, a vertically disposed discharge sleeve at the bottom thereof, a valve mounted for reciprocation in the sleeve comprising a stem, a cylindrical member adapted to reciprocate within the sleeve, ports through said cylindrical member, the member being closed at the top and open at the bottom, a valve stem extending longitudinally through the cylindrical member, a conical valve carried at the bottom of the stem, the conical valve and the cylindrical member being so related that when the conical valve engages the under end of the sleeve the cylindrical member is so positioned that the ports therein are above the bottom of the tank whereby fluid may enter through the ports and the cylindrical member into the sleeve to rest against the conical valve, means for relatively displacing the valve and sleeve so that when the valve is open the ports are masked by the sleeve, the closure at the upper end of the cylindrical member serving then as a valve to prevent discharge of material from the tank to the sleeve during such time as material discharges from the sleeve.

NELSON L. DAVIS.

REFERENCES CITED

The following references are of record in the file of this patent:

UNITED STATES PATENTS

| Number | Name | Date |
|---|---|---|
| 942,697 | Allen | Dec. 7, 1909 |
| 1,118,614 | Allen | Nov. 24, 1914 |
| 1,979,169 | Mitchell | Oct. 30, 1934 |
| 2,025,059 | Kermer | Dec. 24, 1935 |
| 2,437,221 | Cox | Mar. 2, 1948 |